United States Patent [19]

Edwards et al.

[11] Patent Number: 4,603,093
[45] Date of Patent: Jul. 29, 1986

[54] LEAD-ACID BATTERY

[75] Inventors: Dean B. Edwards, Pasadena; Wally E. Rippel, Altadena, both of Calif.

[73] Assignee: California Institute of Technology, Pasadena, Calif.

[21] Appl. No.: 727,118

[22] Filed: Apr. 25, 1985

Related U.S. Application Data

[63] Continuation of Ser. No. 463,650, Feb. 3, 1983, abandoned.

[51] Int. Cl.$^4$ ............................................. H01M 10/12
[52] U.S. Cl. ......................................... 429/54; 429/60; 429/66; 429/160; 429/161; 429/208; 429/225; 429/245
[58] Field of Search ................... 429/161, 160, 53, 60, 429/66, 208, 225, 54, 178, 152-155, 245

[56] References Cited

U.S. PATENT DOCUMENTS

| | | | |
|---|---|---|---|
| 489,115 | 1/1893 | Arnold | 429/208 |
| 517,018 | 3/1894 | Ballard | 429/208 X |
| 793,117 | 6/1905 | Witherbee | 429/178 X |
| 1,069,809 | 8/1913 | Prince | 429/241 |
| 3,042,733 | 7/1962 | Toda et al. | 429/66 |
| 3,429,747 | 2/1969 | Deseniss | 429/94 |
| 3,600,232 | 8/1971 | Daguenet | 429/160 |
| 3,895,959 | 7/1975 | Dehmelt | 429/172 |
| 4,138,533 | 2/1979 | Steig | 429/161 |

FOREIGN PATENT DOCUMENTS 2084791 10/1980 United Kingdom ................ 429/53

Primary Examiner—Anthony Skapars
Attorney, Agent, or Firm—Marvin E. Jacobs

[57] ABSTRACT

A sealed, low maintenance battery (10, 100) is formed of a casing (14, 102) having a sealed lid (12, 104) enclosing cell compartments (22, 110) formed by walls (24, 132). The cells comprise a stack (26) of horizontally disposed negative active plates (30) and positive active plates (28) interspersed with porous, resilient separator sheets (30). Each plate has a set of evenly spaced tigs (40, 41) disposed on one side thereof; like polarity tigs being disposed on one side and opposite polarity tigs on the other. Columns of tigs are electrically and mechanically joined by vertical bus bars (46). The bus bars contain outwardly projecting arms (56) of opposite polarity which are electrically joined at each partition wall (24) to electrically connect the cells in series. The stack is compressed by biasing means such as resilient pad (58) attached to the lid or by joining the tigs (52) to the post (48) at a distance less than the thickness of the mat (124). The end bus bars (46) are joined to straps (60, 62) which connect to the terminals (16, 18). The negative plates contain more capacity than the positive plates and the starved electrolyte imbibed in the separator sheets permits pressurized operation during which oxygen diffuses through the separator sheet to the negative plate where it recombines. Excess pressure is relieved through the vent and pressure relief valve (20).

20 Claims, 13 Drawing Figures

LEAD-ACID BATTERY

ORIGIN OF THE INVENTION

The invention described herein was made in the performance of work under a NASA contract and is subject to the provisions of Section 305 of the National Aeronautics and Space Act of 1958, Public Law 83–568 (72 Stat 435; 42 USC 2457).

CROSS REFERENCE TO RELATED APPLICATION

This application is a continuation of Ser. No. 463,650, filed Feb. 3, 1983, now abandoned.

TECHNICAL FIELD

The present invention relates to lead-acid storage batteries and, more particularly, to a sealed, horizontal plate, lead-acid battery.

BACKGROUND ART

Even though there has been considerable study of alternative electrochemical systems, the lead-acid battery is still the battery-of-choice for general purpose uses such as starting a vehicle, boat or airplane engine, emergency lighting, electric vehicle motive power, energy buffer storage for solar-electric energy, and field hardware whether industrial or military. These batteries may be periodically charged from a generator.

The conventional lead-acid battery is a multi-cell structure. Each cell contains a plurality of vertical positive and negative plates formed of lead-based alloy grids containing layers of electrochemically active pastes. The paste on the positive plate contains lead oxide which is a positive active material and the negative plates contain a negative active material such as sponge lead. This battery has been widely used in the automotive industry for many years and there is substantial experience and tooling in place for manufacturing this battery and its components and the battery is based on readily available materials, is inexpensive to manufacture, and is widely accepted by consumers.

However, the lead-acid battery has several limitations. Electrolyte stratification commonly occurs due to vertical orientation of the plates reducing battery performance. Stirring of the electrolyte by circulation or mixing is complex, unreliable and expensive. The vertical orientation and the expansion and contraction of the active materials during charging and discharging cycles leads to shedding and flaking of conductive particles of the paste which accumulate at the bottom of the cell. In fact, conventional batteries contain a sedimentation well to receive the flake particles. Eventually, enough of these particles collect to form a bridge connecting and short circuiting the electrodes and shortening useful life of the battery.

The electrochemistry of the conventional lead-acid battery results in formation of gases. The buildup of pressure requires provision of a vent cap for each cell which permits evaporation of water from the dilute sulfuric acid electrolyte. Another limitation of conventional lead-acid batteries is high internal resistance which causes decreased energy and power output and non-uniform current density in the plates which leads to shortened life of active materials.

Various improvements have been suggested to improve battery design and performance. Prince (U.S. Pat. No. 1,069,809), Wilson (U.S. Pat. No. 1,126,671), Steig (U.S. Pat. No. 4,138,533) and Deseniss (U.S. Pat. No. 3,429,747) provide multiple tabs or lugs on vertical plates to achieve more equal collection of current. Prince only utilizes two end lugs on the negative grids and one central lug on the positive grids. Wilson requires a copper insert and the electrodes in the Deseniss battery are in a rolled, spiral configuration.

Silvey (U.S. Pat. No. 540,076) discloses a battery containing a stack of horizontal plates. Each plate is separated by a porous, absorbent fabric. Glass wool separators are utilized in the vertical plate battery disclosed by Powers (U.S. Pat. No. 2,428,470). Huffman et al (U.S. Pat. No. 3,310,438) and Wheadon et al (U.S. Pat. No. 3,881,952) use expanded metal sheets as the central grid for forming plate electrodes and Smith (U.S. Pat. No. 3,821,029) provides an aperture in the cell partition for connecting conductors of adjacent cells.

Though these separate structures individually improve the performance of the diverse battery configurations, they do not provide a low cost, high performance, long-life lead-acid battery suitable for deep cycle applications.

STATEMENT OF INVENTION

A lead-acid battery design has been provided in accordance with this invention that has improved energy density, greatly improved power density and long service life. The battery of the invention can be manufactured at low cost utilizing many aspects of the tooling, materials and manufacturing procedures utilized for manufacturing conventional lead-acid batteries.

The improved lead-acid battery of the invention comprises a casing having vertical walls forming compartments receiving cells comprising a biased stack of horizontal plates of alternating polarity interleaved with porous electrolyte laden mats of separation sheets. The plates of a first polarity have multiple, registered tigs attached to a first edge and the plates of opposed polarity have multiple, registered tigs attached to a second, opposed edge. Each set of registered tigs are electrically and mechanically connected by a vertical bus bar. The bus bars extended upwardly and inter-connect through an aperture in the compartment wall to a bus bar of opposite polarity in the adjacent cell. The end bus bars are joined by straps which connect to the external terminals. The casing is sealed by a top having at least one pressure relief valve. The negative plates are preferably of larger capacity than the positive plates and the grids are formed of non-antimonial or low-antimonial lead alloys.

The sealed, maintenance-free operation is made possible by use of negative plates having more capacity than the positive plates. Thus, the positive plate will overcharge first and generate oxygen gas which will diffuse to the negative plate and recombine preventing overpressurization of the cell. The porous separators contain less electrolyte than the pore volume capacity of the sheets and the dispersed cells of liquid are thin enough in cross-section to permit ready oxygen diffusion. The sealed design with pressure relief valves permits controlled pressurization necessary for the electrochemical recombination reactions and also minimizes water loss by evaporation or electrolysis, thus contributing to increased service life.

The horizontal plate configuration eliminates stratification and the biased stack of plates with compliant separator sheets, prevents sloughing off of active material eliminating the need for a sedimentation well and improves power and energy density. The horizontal stack of plates is easier to compress than a vertical stack since each cell can be compressed separately. In the vertical plate configuration the cell walls in contact with the electrode surfaces are not accessible. The horizontal plate configuration also produces a cell which can readily reject heat generated internally. The short height coupled with the large top and bottom surfaces results in a low thermal impedance for the cell. The horizontal disposition also facilitates use of multiple connections to each plate without spatial interference as occurs with vertical stacking.

Increased power density is also aided by provision of a plurality of current connecting tigs along the side of the plates. The width of the plates can be increased and thickness decreased without diminishing power density or energy density. The multiple tig design allows use of short plates and low stack heights providing short conduction paths which also assures low internal resistance. Furthermore, by providing multiple tigs and disposing negative tigs on one side and positive on the other side of the stack, current densities within the cell tends to be more uniform which, in turn, leads to increased life of the active material.

Other features of the invention relate to variations in tig and bar design and provision of compliance within the vertical direction of the cell to allow the stack to expand or contract during charge or discharge without cracking or disrupting either the layer of active material or the tig and bar structure.

These and many other features and attendant advantages of the present invention will become apparent as the invention becomes better understood by reference to the following detailed description when considered in conjunction with the accompanying drawings.

DETAILED DESCRIPTION OF THE INVENTION

Figure 1:
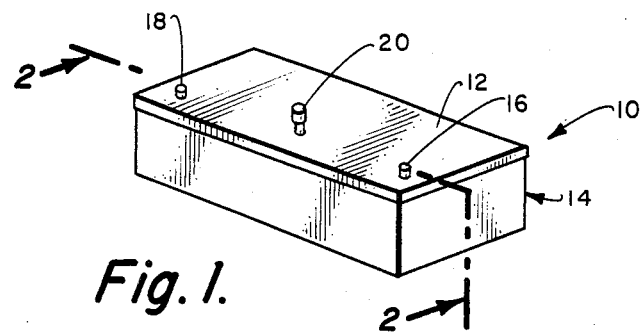
FIG. 1 is a perspective view of a first embodiment of a battery in accordance with this invention.

Referring now to FIG. 1, at battery 10 comprises a lid 12 sealed to a casing 14. The battery contains a set of exterior terminals 16, 18 which can be provided on top 12 or any side wall of the casing. At least one pressure relief valve 20 is present to provide pressure assisted operation.

Figure 5:
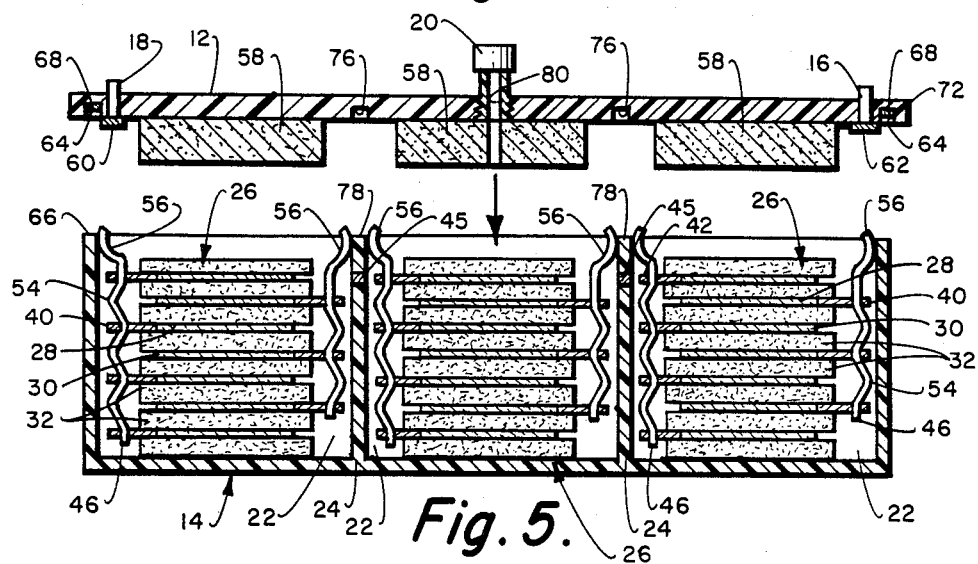
FIG. 5 is a sectional view of the battery shown before assembly of the top and casing.
Figure 6:
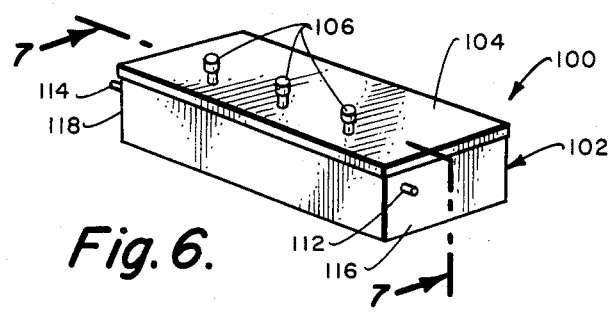
FIG. 6 is a perspective view of an alternative battery embodiment.
Figure 13:
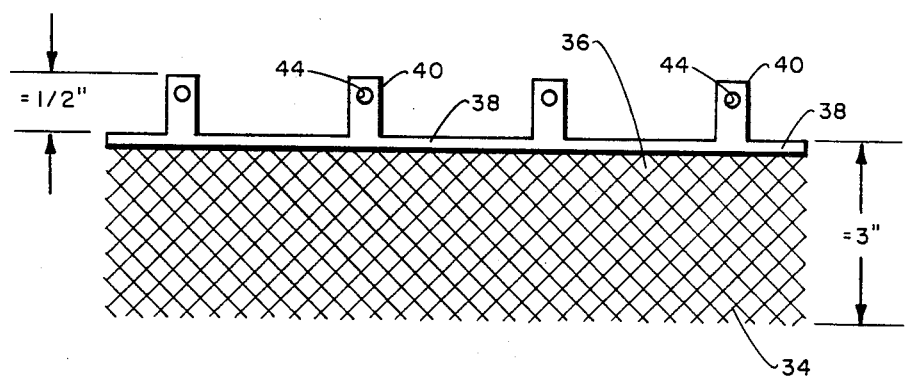
FIG. 13 is a top elevation view of a configuration of a plate with multiple tigs.

Referring now to FIG. 5, the casing 14 is divided into n cell compartments 22 by means of (n-1) walls 24. Each wall contains an inter-cell connector such as a cylinder 45 of lead sealingly received in the upper portion of the wall 24. Each compartment 22 receives a horizontal stack 26 of negative plates 30 and positive plates 28 interleaved with resilient, porous, electrolyte-laden separator sheets 32. As shown in FIG. 13, the positive or negative can be formed of a thin, light-weight substrate sheet 34 such as cast, expanded or perforated lead or lead alloy carrying a layer 36 of electrochemically active paste and having a strip 38 along one edge to which is attached a plurality of tabs or tigs 40.

Figure 2:
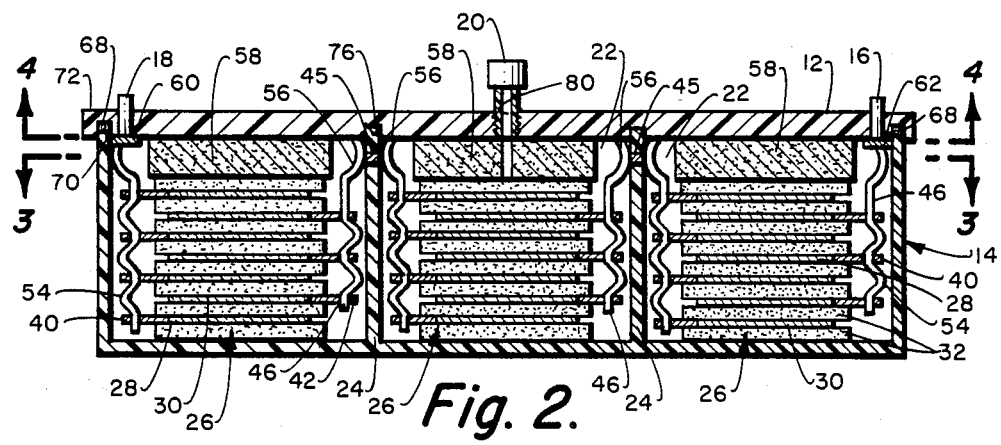
FIG. 2 is a view in section taken on line 2—2 of FIG. 1.
Figure 3:
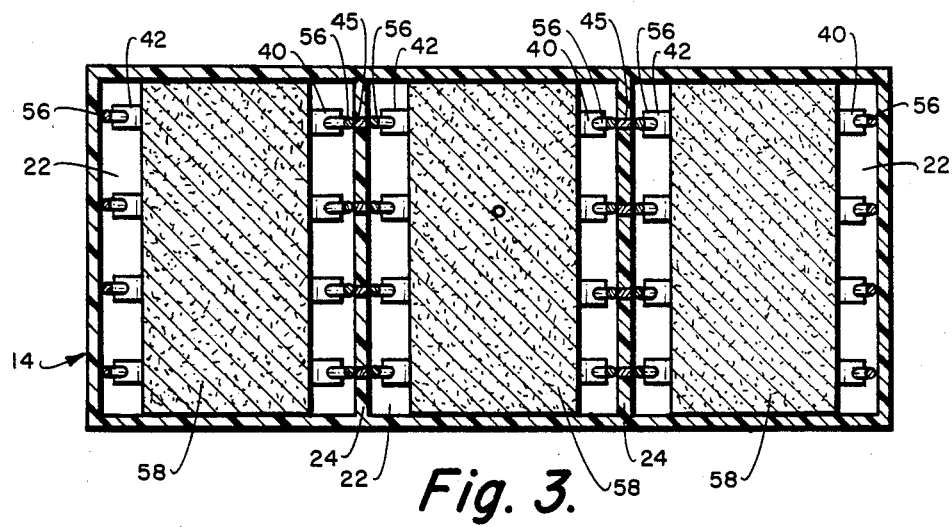
FIG. 3 is a view in section taken along line 3—3 of FIG. 2.
Figure 10:
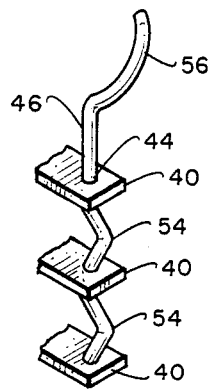
FIG. 10 is a perspective view of a tig-bus bar-assembly utilized with battery FIG. 1.

Referring now to FIGS. 2 and 5, tigs 40 on the positive plates 28 are disposed along the opposite edge of the tigs 42 on the negative plates 30. The tigs along each edge are registered in the vertical direction and each set of aligned tigs is adapted to be mechanically and electrically joined by a bus bar 46. As shown in FIGS. 10 and 13, the tig 40 may contain an aperture 44 for receiving the bus bar 46. The aperture on the bus bar may have any suitable cross section such as circular, triangular, square, etc. 48. In another embodiment shown in FIG. 11 the bus bar has a plurality of apertures 50 for receiving the tigs 52. The tigs may also be provided in diverse shapes such as slotted, triangular or trapezoidal. The tigs are preferably sized to fit snugly into the corresponding slot in the bus bar. The tig-bus bar joint can be soldered or welded to improve the mechanical and electrical contact.

Figure 4:
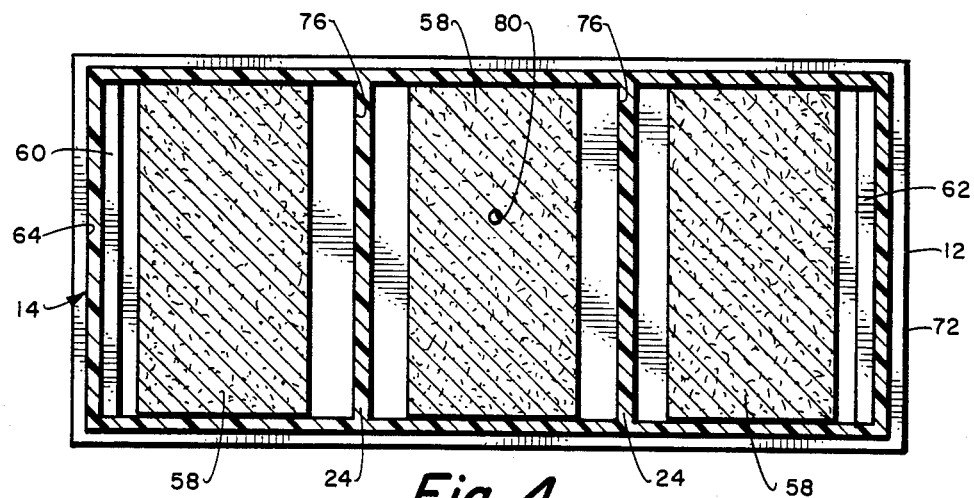
FIG. 4 is a view in section taken along line 4—4 of FIG. 2.

The bus bar illustrated in FIGS. 2, 3, 5 and 10 is formed of a resilient conductor and contains a plurality of bends 54 so that the bus bar is compliant in the vertical direction. The bus bar contains an outwardly directed upper arm 56 that fits snugly against the wall 24. The stacks 26 are shown in expanded form in FIG. 5. The lid 12 as shown in FIGS. 4 and 5 contains a biasing member such as a rigid, closed-cell foam pad 58 capable of compressing the stack.

The lid also contains a set of straps 60, 62 along each inner, side edge which connect to the terminals 18, 16, respectively. The straps connect the end bus bars electrically and also bias the bus bar downwardly when the lid is engaged. The straps and terminals could be provided in the end walls instead of the lid. The lid 12 has a groove 64 along the inner perimeter adapted to sealingly receive the upper ends 66 of the casing walls. A gasket 68 may be inserted in the groove 64 and sealant-adhesive may be utilized to seal the intersection 70 of the lip 72 of the lid with the outer casing walls. Grooves 76 may be provided in the inner portion of the lid 12 to receive the upper ends 78 of the compartment walls 24. The grooves should not form a gas-tight fit since the grooves can form the passage for inter-compartment pressure equalization since only one port 80 and pressure relief valve 20 is provided in this embodiment. A common headspace can also be provided by eliminating the grooves 76 and reducing the height of the compartment walls 24 to less than the height of the walls of the casing.

When the lid 12 is installed on the casing 14, the rigid pads 58 will apply pressure to the stack 26, compressing the porous, separator sheets 32. The compliant bus bars will compress until the upper arms 46 are in contact with lead cylinders 45.

The plates contain a central grid preferably formed of thin, perforated or cast metal. The metal is suitably 10 to 100 mils, preferably 40 to 60 mils, in thickness and may be cast, perforated mechanically such as by the expanded metal technique as disclosed in U.S. Pat. Nos. 3,310,438 or 3,881,952, the disclosures of which are expressly incorporated herein by reference. The sheet has a header along one edge from which the multiple tigs project. The use of multiple tigs along an edge permits increasing the length of the plates. The L/W ratio can now exceed 1 and can be from 1.5/1 to 3/1 or higher.

The metal substrate forms a grid for receiving a layer of paste to form a Faure-type plate. The grid is preferably formed of a pure lead or a low non-antimonial lead alloy such as a lead-calcium or lead-calcium-tin alloy to eliminate formation of hydrogen gas.

Pasted plate lead-acid batteries are by far the most common type of lead-acid battery. The paste may comprise lead for the negative plate and lead oxide or lead sulfate for the positive plate. Water-swellable bulking agents such as 0.05 to 0.5 percent by weight of ligno-sulfonates and 1 to 3 percent by weight of expander materials such as barium sulfate or carbon black may be present. Typically, a paste of lead oxide is applied to both surfaces of the postive and negative grids and cured. After the battery is assembled, voltage is applied to the terminals and the lead oxide paste on the positive grid is oxidized to lead dioxide while the lead oxide on the negative plate is reduced to sponge lead. During operation of the lead-acid battery, the lead will be oxidized to lead oxide and the paste will expand. The compliant bus bar can expand and/or the compliant separator can compress to relieve stress on the top and prevent cracking of the cured paste layer.

The separator sheets are yieldable porous mats having good wetability for the electrolyte so that the sheet is capable of retaining liquid electrolyte while permitting diffusion of oxygen gas to the negative electrode. The sheet retains virtually all electrolyte except for the amount which seeps into the plate. Preferred mats are formed of high surface area, high porosity fiberglass mats. Suitable mats are formed from micronsized fiberglass having a porosity of 80 to 95 percent. The volume of electrolyte contained in the sheet is less than 90 percent of the pore volume, usually from 20 to 80 percent thereof.

A battery is assembled by applying electrode paste to both surfaces of the grid substrates and curing the paste. The electrodes are interleaved with separator sheets and the tigs are inserted through the slots in the bus bars or vice versa and are then soldered or welded, if required. The electrolyte is then imbibed into the separator sheets. The stacks are inserted into the cell compartments and the lids applied and sealed to place the interior bus bars in contact with the two end sets of bus bars. The resilient separator mats are compressed and are squeezed against the grid. The porous mats provide a channel for the gas to move through the stack aiding gas management in each cell. The battery is evacuated by applying a vacuum pump to the port in the lid and the pressure relief valve is then installed. The electrodes can then be actuated by applying an initial charge to the terminals.

A further embodiment is shown in FIGS. 6–9 and 11. The battery 100 is formed of a casing 102 having a sealed lid 104 to form pressurized, sealed system. In this embodiment, the lid contains a pressure relief valve 106 and a vent 108 for each cell compartment 110. The terminals 112, 114 are placed in the end walls 143, 145 rather than on the lid.

Figure 7:
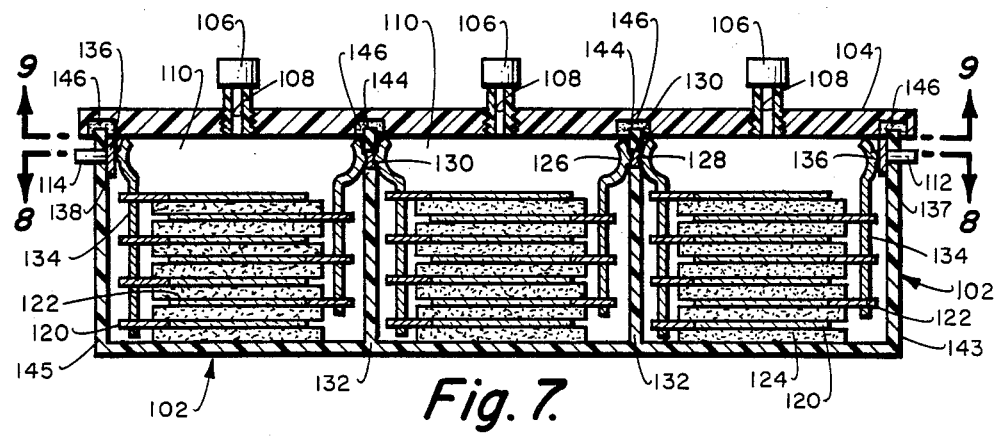
FIG. 7 is a sectional view taken on line 7—7 of FIG. 6.
Figure 8:
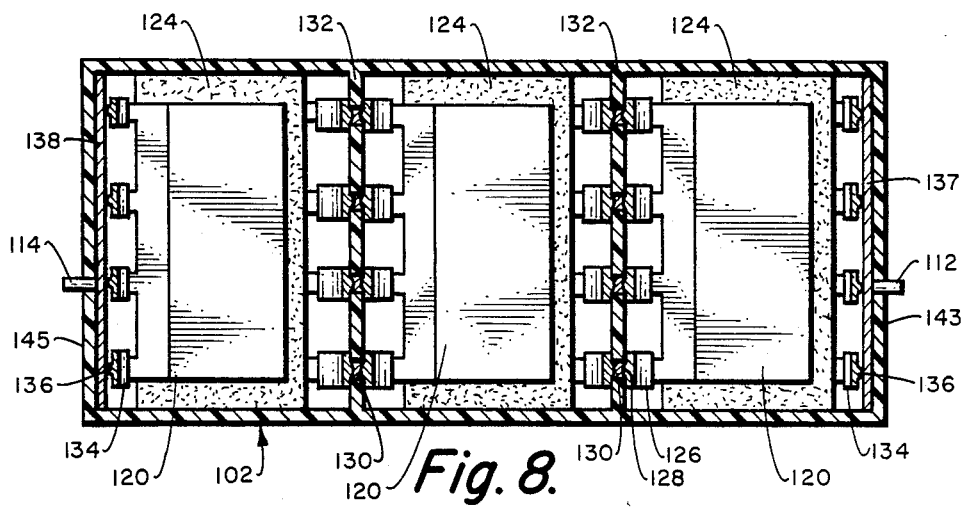
FIG. 8 is a section taken along line 8—8 of FIG. 7.
Figure 11:
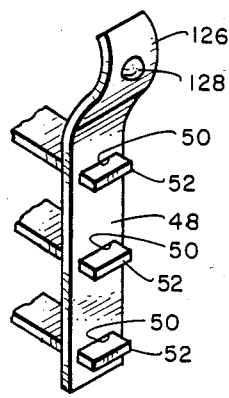
FIG. 11 is a perspective view of a further tig-bus-bar assembly.

Referring to FIG. 11, the bus bar 48 contains slots 50 for receiving the tigs 52. The distance between slots 50 can be less than the expanded thickness of the separator sheet 124. Thus, when the plates 120, 122 are assembled to form a stack the compressed separator sheet 124 will uniformly compress the layer of active material against the grid substrate improving contact and preventing flaking. Each bus bar 48 has an upper, outwardly diverging arm 126 containing a protrusion such as a knob 128. The knobs 128 facing the inner walls contact each other through a passage 130 in the cell compartment wall 132. The knobs can be soldered or welded and the passages sealed to form a gas-tight seal between all compartments 110. Referring now to FIGS. 7 and 8, the protrusion 136 on the end posts 134 adjacent the end walls 143, 145 connect to straps 137, 138 which sealingly connect through the end walls to the terminals 112, 114.

Figure 12:
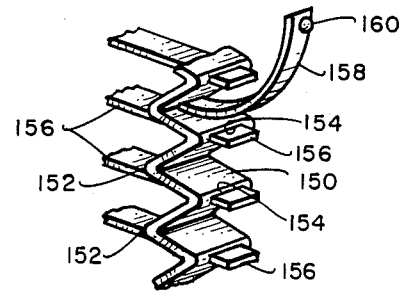
FIG. 12 is a perspective view of an additional bus-bar assembly.

A further and preferred embodiment of a bus bar 150 is illustrated in FIG. 12. The bus bar exhibits compliance by providing a plurality of bends 152. The bus bar 150 is formed of a thin, lighweight strip of metal containing a plurality of slots 154 for receiving the tigs 156 which attach to a grid, not shown. An outwardly bent spur 158 containing a knob 160 for interconnecting to an adjacent strap is attached to the strap. This permits the strap to extend above the point of connection. Thus, additional slots can be provided and additional grids packed into the upper portion of the cell. This provides more efficient space utilization increasing both the power and energy produced per unit of volume.

Figure 9:
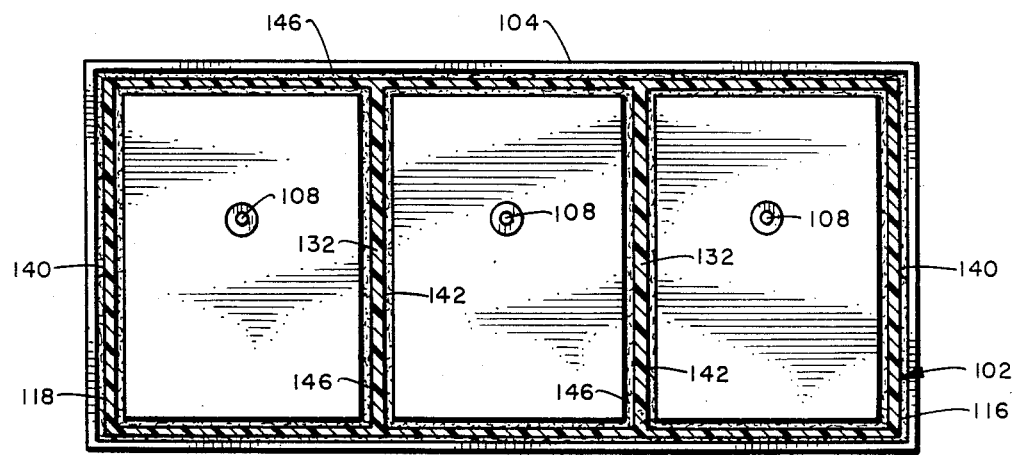
FIG. 9 is a view in section taken along line 9—9 of FIG. 7.

The lid 104 as shown in FIG. 9 has a perimeter groove 140 and cross grooves 142 positioned to receive the top edges 144 (FIG. 7) of the partition walls 132 and casing walls 143, 145. The perimeter groove 146 forms lip walls 116, 118 extending over the top edges of the casing. A compliant gasket 146 can be inserted into the grooves. The lid 104 is then placed on the casing 102 and the edges sealed. The battery can be activated by charging.

A 2.5 kg test cell was constructed from 0.020 inch expanded lead sheet grids (0.3 percent Sn, 0.07 percent Ca) hand pasted with conventional positive and negative pastes formed in standard 1050 sulfuric acid using standard techniques. The pastes were cured by wrapping in polyethylene film and held at room temperature for ten days. The formed plates were washed and air dried. The cell was housed in an open top plexiglass tray which in turn was housed in a ¾ inch thick plexiglass pressure vessel. Initial charging of the cell was performed with the pressure vessel sealed so that pressure could build up (during charging, the pressure limit of a bypass valve, 7 PSI, was reached and some venting did occur. The voltage limit of this recharge was 2.45 volts). Data on the test cell is provided in the following table:

TABLE I
Test Cell Data

| | |
|---|---|
| Number of Negative Plates | 8 |
| Number of Positive Plates | 7 |
| Average Grid Weight | 27.5 g |
| Average Formed Neg. Plate Wt. (incl. grid) | 107.6 g |
| Spread in Neg. Plate Wt. | 7 g |
| Average Formed Pos. Plate Wt. (incl. grid) | 116.4 g |
| Spread in Pos. Plate Wt. | 15 g |
| Total Weight of Pos. Active Material | 622.3 g |
| Total Weight of Neg. Active Material | 640.8 g |
| Total Weight of 1.335 Electrolyte Added | 788.0 g |
| Total Wt. of Separators | 50 g |
| Total Wt. of Vertical Straps | 56 g |
| Total Cell Wt. (excl. case) | 2464 g |
| Neg. Paste Density at time of pasting | 4.638 g/cm$^3$ |
| Pos. Paste Density at time of pasting | 4.164 g/cm$^3$ |
| Neg. Paste Density after formation and drying | 4.307 g/cm$^3$ |
| Pos. Paste Density after formation and drying | 3.892 g/cm |
| Average Plate Dimensions | 7.6 cm × 21.6 cm |
| Total Positive Plate Area | 2303 cm$^2$ |
| Average Formed Neg. Plate Thickness (Calc.) | 0.1280 cm (0.0504) |
| Average Formed Pos. Plate Thickness (Calc.) | 0.1539 cm (0.0605) |
| Separator Type | .015" Dextor B Micro Fiber |
| Total Separator Thickness (4 layers) | 0.152 cm (.060") |
| Measured Effective Grid Resistance (each grid) | 0.00169Ω |
| Total Grid Resistance (8 Neg., 7 Pos.) | 0.000453Ω |
| Vertical Strap Dimensions | 6.35 cmH × 1.91 cmW × 0.51 cmI |
| Effective Resistance of Each Strap (Calc.) | 0.000460Ω |
| Total Effective Strap Resistance (4 Neg., 4 Pos.) | 0.000230Ω |
| Total Conductor Resistance (Grids plus Straps) | 0.6831MΩ |
| Conductivity to Weight Ratio for Grid Pairs | 5.39Ω/g |
| Conductivity to Weight Ratio for Vertical Strap Pairs | 77.6Ω/g |

A constant current discharge was performed which resulted in an energy output of 36.94 Wh/kg (C/3, 26.5° C., 1.750 V cutoff). Two high current discharge tests of the cell were performed, each lasting 30 seconds and each with the cell approximately 20 percent discharged. These tests demonstrated a power density of approximately 280 w/kg (25.5° C., 20 percent discharged). The positive material utilization was about 33 percent and the negative material utilization 27.7 percent.

The total measured cell resistance is about 1.7 MΩ and the total conductor resistance is about 0.6 M Ω. Accordingly, about 60 percent of the cell resistance is associated with electrolyte and paste resistance. Assuming that the electrolyte resistance dominates over the paste resistance, it follows that a significant improvement should result when thinner plates are used. With 0.040 inch positives, the electrolyte component of resistance (cell weight maintained) should drop by a factor of between 0.66 to 0.44. Accordingly, with 0.040 inch plates, the power density should increase to at least 380 W/kg.

At present an energy density of approximately 36.9 Wh/kg is obtained at C/3, 26° C. with the corresponding positive utilization equaling 33 percent. With 0.040 inch positives, previous efforts indicate that a utilization of 40 percent is possible. Furthermore, electrolyte utilizations in excess of 60 percent and negative utilizations in excess of 35 percent should be possible under sealed mode operation. These considerations indicate that a C/3, 26° C. energy density of 44 Wh/kg is possible.

A total of 15 recharges, 14 constant current discharges and one peak power test were performed on the previously described test cell. Excellent initial energy density was achieved: 41 Wh/kg at C/3, 80° F., for cycles 2 and 3 with 49 Wh/kg indicated at 120° F. Acceptable O$_2$ recombination was observed; gauge pressure during recharge did not exceed 8 PSI with charge voltage equaling 2.35 and cell temperature equaling 80° F. A 19 percent capacity increase was noted when the cell temperature was increased from 80° F. to 120° F.

There was a high rate of capacity decline from 51.75 AH (at the third cycle to less than 35.74 AH at cycle 15). There also was a high rate of impedance decrease from 1.7 MΩ after cycle 1 to 2.4 MΩ after cycle 15.

The test cell was then removed from the pressure vessel for examination. The top two negative plates and first positive plate were severed from the vertical top strap and carefully removed. On examination it was observed that two of the four positive vertical straps were badly corroded at the point of soldering to a lead. The corrosion was probably due to use of 60/40 tin/lead solder. Both negative plates removed appear to be completely discharged. The removed positive plate and one in the stack appear to be in excellent condition fully discharged and without detectable softening. There was negligible corrosion and growth on the expanded metal grids.

The capacity loss and increase in impedance was due to errosion of the strap and discharge of the negative plates caused by air leaking into the vessel. The excellent quality of the positive plates after 16 deep cycles—despite the absence of phosphoric acid—suggests that the sealed horizontal plate battery of the invention will provide long life as well as high energy and high power densities. The test cell results were achieved without compression loading of the plates which is expected to increase cycle life. The multiple tigs and bussing reduce conductor resistance by shortening the length of conduction paths. Power density in the cell of the invention is independent of plate width since the number of busses can be increased in proportion to increase in width, thus keeping mean conduction path constant. The cell of the invention is compatible with the use of non-antimonial alloys for deep cycle applications due to the support provided by compression loading and use of compliant vertical busses. The cell of the invention is also compatible with use of thin plates in a high performance design since the horizontal disposition of the plates reduces shedding, the starved electrolyte operation reduces stratification, and the low or non-antimony conductor materials have low corrosion rates.

It is to be realized that only preferred embodiments of the invention have been described and that numerous substitutions, modifications and alterations are permissible without departing from the spirit and scope of the invention as defined in the following claims.

We claim:

1. A lead-acid storage battery comprising in combination:

a casing member having perimeter walls and a bottom wall defining a cavity and a plurality of partition walls dividing the cavity into cell compartments;

a battery cell received in each compartment comprising a stack of a plurality of horizontally disposed negative active plates each containing a plurality of tigs spaced along a first edge aligned in vertical registration with tigs on other negative active plates in said stack to form a set of columns, a plurality of positive active plates each having a plurality of tigs spaced along an edge opposed to said first edge and aligned with the tigs in the other positive plates in the stack to form a second set of columns, said positive active plates alternating with said negative active plates and said negative plates having a capacity greater than the capacity of the positive plates, and porous, liquid electrolyte-containing separator sheets disposed between each of said plates, said sheets having good wetability for the electrolyte, having a pore volume greater than the amount of electrolyte contained therein and said sheets retaining virtually all of the electrolyte except the amount contained in the plates;

a plurality of vertical, positive bus bars interconnecting each column of positive tigs;

a plurality of vertical, negative bus bars interconnecting each column of negative tigs;

connector means joining a positive bus bar to the negative bus bar on the opposite side of a partition wall;

a negative strap interconnecting the negative bus bars at one end cell;

a positive strap interconnecting the positive bus bars at the other end cell;

a positive terminal connected to said positive strap;

a negative terminal connected to said negative strap; and a top sealingly received on said casing.

2. A battery according to claim 1 in which the top of the casing contains a pressure relief valve.

3. A battery according to claim 1 in which the partition walls contain apertures along the upper ends thereof receiving said connector means.

4. A battery according to claim 3 in which the apertures are aligned with said bus bars.

5. A battery according to claim 4 in which the connector means includes a metal insert sealingly received in said aperture.

6. A battery according to claim 1 in which the tigs are equally spaced along said edges.

7. A battery according to claim 1 further including compliant bus bars having compliance in the vertical direction.

8. A battery according to claim 7 in which the bus bars contain resilient bends.

9. A battery according to claim 8 in which the bus bar contains slots between the bends for receiving the tigs.

10. A battery according to claim 8 in which the tigs contain apertures for receiving the bus bars between the bends.

11. A battery according to claim 1 further including means for compressing the stacks.

12. A battery according to claim 11 in which the compressing means comprise a resilient pad disposed between the top of the stack and the inner surface of the top.

13. A battery according to claim 11 in which compliant separators are used to transmit axial pressure to the electrode surfaces.

14. A battery according to claim 1 in which the plates comprise a lightweight grid of non-antimonial or low-antimonial alloy containing a layer of active paste.

15. A battery according to claim 1 in which the grid is formed of pure lead or lead-calcium alloy.

16. A battery according to claim 1 in which the separator sheet is formed of a porous mat of micron-sized, fiberglass fibers.

17. A battery according to claim 11 in which the compression means comprises means connecting the adjacent plates to the bus bars at a distance less than the expanded thickness of the separator sheet.

18. A battery cell comprising a container having a compartment receiving a stack of a plurality of horizontally disposed negative active plates each containing a plurality of tigs spaced along a first edge aligned in vertical registration with tigs on other negative active plates in said stack to form a set of columns, a plurality of positive active plates each having a plurality of tigs spaced along an edge opposed to said first edge and aligned with tigs in the other positive plates in the stack to form a second set of columns, said positve active plates alternating with said negative active plates and said negative plates having a capacity greater than the capacity of the positive plates, and porous, liquid electrolyte-containing separator sheets disposed between each of said plates, said sheets having good wetability for the electrolyte, having a pore volume greater than the amount of electrolyte contained therein and said sheets retaining virtually all of the electrolyte except the amount contained in the plates;

a plurality of vertical, positive bus bars interconnecting each column of positive tigs; and a plurality of vertical, negative bus bars interconnecting each column of negative tigs.

19. In a lead-acid storage battery having a casing divided into a plurality of all compartments by partition walls, the improvement consisting of:

a battery cell compartment receiving a stack of a plurality of horizontally disposed negative active plates each containing a plurality of tigs spaced along a first edge aligned in vertical registration with tigs on other negative active plates in said stack to form a set of columns, a plurality of positive active plates each having a plurality of tigs spaced along an edge opposed to said first edge and aligned with the tigs in the other positive plates in the stack to form a second set of columns, said positive active plates alternating with said negative active plates and said negative plates having a capacity greater than the capacity of the positive plates, and porous, liquid electrolyte-containing separator sheets disposed between each of said plates, said sheets having good wetability for the electrolyte, having a pore volume greater than the amount of electrolyte contained therein and said sheets retaining virtually all of the electrolyte except the amount contained in the plates;

a plurality of vertical, positive bus bars interconnecting each column of positive tigs; and a plurality of vertical, negative bus bars interconnecting each column of negative tigs.

20. A battery according to claim 19 in which the separators are compliant and transmit axial pressure to the electrode surfaces.

* * * * *